US007702355B2

(12) United States Patent
Jonsson et al.

(10) Patent No.: US 7,702,355 B2
(45) Date of Patent: Apr. 20, 2010

(54) CELL SELECTION IN BROADCAST AND MULTICAST COMMUNICATION ENVIRONMENTS

(75) Inventors: Elias Jonsson, Malmö (SE); Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1110 days.

(21) Appl. No.: 11/305,128

(22) Filed: Dec. 19, 2005

(65) Prior Publication Data

US 2006/0234755 A1 Oct. 19, 2006

Related U.S. Application Data

(60) Provisional application No. 60/671,099, filed on Apr. 14, 2005.

(51) Int. Cl.
*H04B 7/00* (2006.01)
(52) U.S. Cl. .................... 455/525; 455/435.3
(58) Field of Classification Search .................. 455/69, 455/522, 3.06, 8, 10, 570; 375/148, 130, 375/141, 147
See application file for complete search history.

(56) References Cited

U.S. PATENT DOCUMENTS

| 7,373,148 B2 * | 5/2008 | Kim et al. ............... 455/437 |
| 2004/0081125 A1 | 4/2004 | Ranta-Aho et al. |
| 2004/0229624 A1 * | 11/2004 | Cai et al. ............... 455/449 |
| 2005/0079821 A1 | 4/2005 | Bi |

FOREIGN PATENT DOCUMENTS

| EP | 1 480 350 A1 | 11/2004 |
| EP | 1480350 A1 * | 11/2004 |
| WO | WO 2004/112269 A1 | 12/2004 |

OTHER PUBLICATIONS

3GPP Technical Specification TS 23.246 Ver. 6.2.0, "Technical Specification Group Services and Systems Aspects; Multimedia Broadcast/Multicast Service (MBMS); Architecture and functional description" Release 6, Apr. 2003.
3GPP Technical Report TR 23.846 Ver. 6.1.0, "Technical Specification Group Services and System Aspects; Multimedia Broadcast/Multicast Service (MBMS); Architecture and functional description" Release 6, Dec. 2002.
Bakhuizen, M. and Horn, U.: "Mobile broadcast/multicast in mobile networks," Ericsson Review, Issue 1 (2005).
PCT International Search Report, dated Aug. 1, 2006, in connection with International Application No. PCT/EP2006/003687.
PCT Written Opinion, dated Aug. 1, 2006, in connection with International Application No. PCT/EP2006/003687.

* cited by examiner

*Primary Examiner*—Tu X Nguyen
(74) *Attorney, Agent, or Firm*—Potomac Patent Group PLLC

(57) ABSTRACT

Cells from which to receive information transmitted on a traffic channel that is not subject to power control in a cellular radio communications system are selected. Selection involves, for each of a plurality of candidate cells, using an offset value that indicates a relationship between a pilot channel transmission power and the traffic channel transmission power associated with the candidate cell to determine a value of quality indicative of power of a signal transmitted on the traffic channel associated with the candidate cell; and selecting, based on the values of quality indicative of power of a signal transmitted on the traffic channel, a number, N, of cells from the plurality of candidate cells.

20 Claims, 9 Drawing Sheets

CELL SELECTION IN BROADCAST AND MULTICAST COMMUNICATION ENVIRONMENTS

CROSS REFERENCE TO RELATED APPLICATIONS

This application claims the benefit of U.S. Provisional Application No. 60/671,099, filed Apr. 14, 2005, which is hereby incorporated herein by reference in its entirety.

BACKGROUND

This invention relates to communication devices and more particularly to communication devices that receive multiple replicas, sent from different transmitters, of the same information.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for economy of explanation, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (user equipment or users), respectively, in the downlink (base-to-user equipment) direction. User Equipment (UE) communicates with the system through, for example, respective dedicated physical channels (DPCHs). WCDMA terminology is used here, but it will be appreciated that other systems have corresponding terminology. Scrambling and channelization codes and transmit power control are well known in the art.

FIG. 1 depicts a mobile radio cellular telecommunication system 100, which may be, for example, a CDMA or a WCDMA communication system. Radio network controllers (RNCs) 112, 114 control various radio network functions including for example radio access bearer setup, diversity handover, and the like. More generally, each RNC directs UE calls via the appropriate base station(s) (BSs), which communicate with each other through downlink (i.e., base-to-UE or forward) and uplink (i.e., UE-to-base or reverse) channels. RNC 112 is shown coupled to BSs 116, 118, 120, and RNC 114 is shown coupled to BSs 122, 124, 126. Each BS serves a geographical area that can be divided into one or more cell(s). BS 126 is shown as having five antenna sectors S1-S5, which can be said to make up the cell of the BS 126. The BSs are coupled to their corresponding RNCs by dedicated telephone lines, optical fiber links, microwave links, and the like. Both RNCs 112, 114 are connected with external networks such as the public switched telephone network (PSTN), the Internet, and the like through one or more core network nodes like a mobile switching center (not shown) and/or a packet radio service node (not shown). In FIG. 1, UEs 128, 130 are shown communicating with plural base stations: UE 128 communicates with BSs 116, 118, 120, and UE 130 communicates with BSs 120, 122. A control link between RNCs 112, 114 permits diversity communications to/from UE 130 via BSs 120, 122.

At the UE, the modulated carrier signal (Layer 1) is processed to produce an estimate of the original information data stream intended for the receiver. The composite received baseband spread signal is commonly provided to a RAKE processor that includes a number of "fingers", or de-spreaders, that are each assigned to respective ones of selected components, such as multipath echoes or streams from different base stations, in the received signal. Each finger combines a received component with the scrambling sequence and the appropriate channelization code so as to de-spread a component of the received composite signal. The RAKE processor typically de-spreads both sent information data and pilot or training symbols that are included in the composite signal.

FIG. 2 is a block diagram of a receiver 200, such as a UE in a WCDMA communication system, that receives radio signals through an antenna 202 and down-converts and samples the received signals in a front-end receiver (Fe RX) 204. The output samples are fed from Fe RX 204 to a RAKE combiner and channel estimator 206 that de-spreads the received data including the pilot channel, estimates the impulse response of the radio channel, and de-spreads and combines received echoes of the received data and control symbols. An output of the combiner/estimator 206 is provided to a symbol detector 208 that produces information that is further processed as appropriate for the particular communication system. RAKE combining and channel estimation are well known in the art.

A Multimedia Broadcast/Multicast Service (MBMS) for the frequency division duplex (FDD) aspect of the WCDMA system is being standardized by 3GPP. MBMS is described in 3GPP Technical Specification TS23.246 ver. 6.2.0 Technical Specification Group Services and System Aspects; Multimedia Broadcast/Multicast Service (MBMS); Architecture and functional description (Release 6) (April 2003) and Technical Report TR23.846 ver. 6.1.0 Technical Specification Group Services and System Aspects; Multimedia Broadcast/Multicast Service (MBMS); Architecture and functional description (Release 6) (December 2002), among other places.

MBMS is intended to offer high-speed and high-quality broadcast, or multicast, transmission to mobile stations (UEs). For example, MBMS can offer the end user a selection of movies to watch. Broadcast and multicast are synonyms for point-to-multipoint communication where data packets are simultaneously transmitted from a single source to multiple destinations. The term "broadcast" refers to the ability to deliver content to all users, whereas the term "multicast" refers to services that are solely delivered to users who have joined a particular multicast group.

M. Bakhuizen and U. Horn, "Mobile broadcast/multicast in mobile networks," Ericsson Review, Issue 1 (2005) provides an overview of MBMS. There it is described how, for example in WCDMA, MBMS reuses existing logical and physical channels to the greatest possible extent. In particular, the implementation in WCDMA requires only three new logical channels and one new physical channel. The new logical channels are:

MBMS point-to-multipoint control channel (MCCH), which contains details (e.g., spreading factors) concerning ongoing and upcoming MBMS sessions, and is sent repetitively within a period of 480 ms or 1.28 s;

MBMS point-to-multipoint scheduling channel (MSCH), which provides information (e.g., a program guide) on data scheduled on MTCH; and MBMS point-to-multipoint traffic channel (MTCH), which carries the actual MBMS application data (e.g., movie content).

The new physical channel is the MBMS notification indicator channel (MICH) by which the network informs UEs of available MBMS information on MCCH. MCCH, MSCH and MTCH reuse the forward access channel (FACH) transport and secondary common control physical channel (S-CCPCH) in WCDMA. The Radio Link Control (RLC) and Medium Access Control (MAC) layers reuse much of the existing protocol stacks.

Since MBMS is a broadcasting service, the same physical channel may simultaneously be received by multiple UEs (e.g., mobile handsets or other mobile equipment). Consequently MBMS is not subject to power control. With no power control, other ways need to be found to guarantee quality of service. Accordingly, to enhance the quality and bit rate of the MBMS transmission, it has been agreed in 3GPP to use large interleaving depths, that is, large Transmission Time Intervals (TTIs) (each TTI includes one transport block and has a length of three slots), to obtain interleaving gain. It has also been agreed to use multicast on Layer 1, that is, the UE should be able to receive multiple replicas of the same bitstream from different base stations, each of which is a Node B in 3GPP vocabulary. In particular, it is proposed that several clusters should send the same information to get space diversity. As used herein, the term "cluster" means a number of radio links (a number of cells) that are aligned in time. The transmission timing of the cluster determines how to combine the sent data in order to yield an improved reception of the information. Three different combining methods are possible:

1) RAKE combining: when all clusters' transmissions are within a certain period of time, for example 296 chips, of one another, RAKE combining (as is done for DPCH) can be performed.
2) Soft combining: when all clusters' transmissions occur within a time span measured as the duration of a TTI plus the duration of one slot (herein denoted "TTI+one slot"), a soft buffer should be maintained, in which the combiner output symbols are added for each cluster. Soft combining is well known in the art, and is used by some kinds of turbo decoders and by hybrid automatic repeat request (HARQ) in high-speed downlink packet access (HSDPA) which is an evolution of WCDMA communication systems.
3) Selection combining: when a cluster's transmission is time misaligned by more than a TTI+one slot from another cluster's transmission, then full decoding of each cluster's sent transport block is performed, and one of the decoded transport blocks is then selected based on, for example, whether the decoded transport block passes a cyclic redundancy check (CRC). Selective combining is well known in the art.

Reception from at most three clusters is supported. This implies at most three S-CCPCHs to receive MTCH data (no multi-code). One of the clusters contains the cell that controls the MBMS transmission. This cell is referred to as the controlling cell, and the other cells transmitting the MTCH are referred to as the neighboring cells. A FACH or dedicated channel (DCH) can be transmitted at the same time as the MTCH.

The UE is usually limited in the number of despreaders it can allocate for demodulating sent data. When the UE is supposed to receive from multiple clusters, the total number of cells contained in all clusters could be larger than the number of available despreaders in the UE. The UE therefore needs to select the best cells to use. The cells whose MTCHs are to be combined are not signaled to the UE; rather, it is up to the UE to decide which cells to use.

U.S. Patent Application Publication US 2004/0081125 A1 discloses a selection diversity strategy based on a comparison of pilot signals on a common pilot channel (CPICH), preferably the primary-CPICH (P-CPICH). However, the power of a signal transmitted on a CPICH may not be a good indicator of the power of a signal transmitted on the MTCH, which is actually transporting the MBMS application data. One reason for this is, for example, that no power control is used on the S-CCPCH.

Thus, it is desired to provide a mechanism for selecting which cells to use when receiving MBMS application data.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Methods and apparatuses for selecting one or more cells from which to receive information transmitted on a traffic channel that is not subject to power control in a cellular radio communications system are described. In one aspect, selection comprises, for each of a plurality of candidate cells, using an offset value that indicates a relationship between a pilot channel transmission power and the traffic channel transmission power associated with the candidate cell to determine a value of quality indicative of power of a signal transmitted on the traffic channel associated with the candidate cell. A number, N, of cells are selected from the plurality of candidate cells based on the values of quality indicative of power of a signal transmitted on the traffic channel.

In some embodiments, the offset value is a gain offset value. In alternative embodiments, the offset value is a power offset value.

In another aspect, for each of the plurality of candidate cells, a quality indicative of power of a signal transmitted on the pilot channel is measured. The quality indicative of power of the signal transmitted on the pilot channel is, in some embodiments, a channel estimate of the pilot channel. In alternative embodiments, the quality indicative of power of the signal transmitted on the pilot channel is a power estimate derived from estimating a delay profile of the signal transmitted on the pilot channel. In still other alternative embodiments, the quality indicative of power of the signal transmitted on the pilot channel is a signal-to-interference ratio of the signal transmitted on the pilot channel.

In still another aspect, using the offset value to determine the value of quality indicative of power of the signal transmitted on the traffic channel associated with the candidate cell comprises using the offset value and the measured quality indicative of power of the signal transmitted on the pilot channel to derive the value of quality indicative of power of the signal transmitted on the traffic channel.

In yet another aspect, for each of the candidate cells, the offset value is determined by estimating the pilot channel and estimating the traffic channel.

In some alternative embodiments, for at least one of the candidate cells, the offset value is received in a signal transmitted by one of the cells.

In still another aspect, selecting, based on the values of quality indicative of power of the signal transmitted on the traffic channel, the N cells from the plurality of candidate cells comprises allocating a higher priority to a cell whose received signal transmitted on the traffic channel may be RAKE combined with another cell's signal transmitted on the traffic channel; allocating an intermediate priority to a cell whose received signal transmitted on the traffic channel should not be RAKE combined with any other cell's signal transmitted on the traffic channel but whose received signal transmitted on the traffic channel may be soft combined with another cell's signal transmitted on the traffic channel; allocating a lower priority to a cell whose received signal transmitted on the traffic channel should neither be RAKE nor soft combined with any other cell's signal transmitted on the traffic channel; and selecting, based on the values of quality indicative of power of the signal transmitted on the traffic channel and also on the allocated priority of the cell, the N cells from the plurality of candidate cells.

In some embodiments, allocating the higher priority to the cell whose received signal transmitted on the traffic channel may be RAKE combined with another cell's signal transmitted on the traffic channel comprises adjusting the value of quality indicative of power of the signal transmitted on the traffic channel of the cell.

In some embodiments, allocating the lower priority to the cell whose received signal transmitted on the traffic channel should neither be RAKE nor soft combined with any other cell's signal transmitted on the traffic channel comprises adjusting the value of quality indicative of power of the signal transmitted on the traffic channel of the cell.

BRIEF DESCRIPTION OF THE DRAWINGS

The objects and advantages of the invention will be understood by reading the following detailed description in conjunction with the drawings in which.

DETAILED DESCRIPTION

Figure 1:
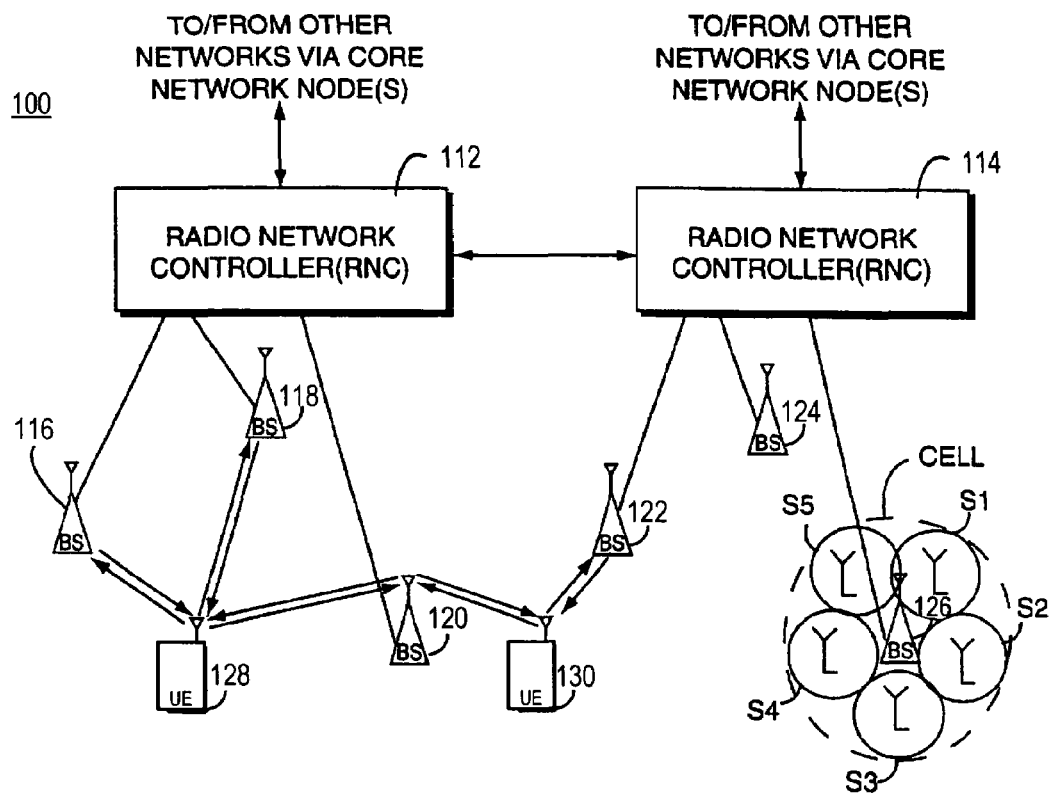
FIG. 1 depicts a telecommunication system.
Figure 2:
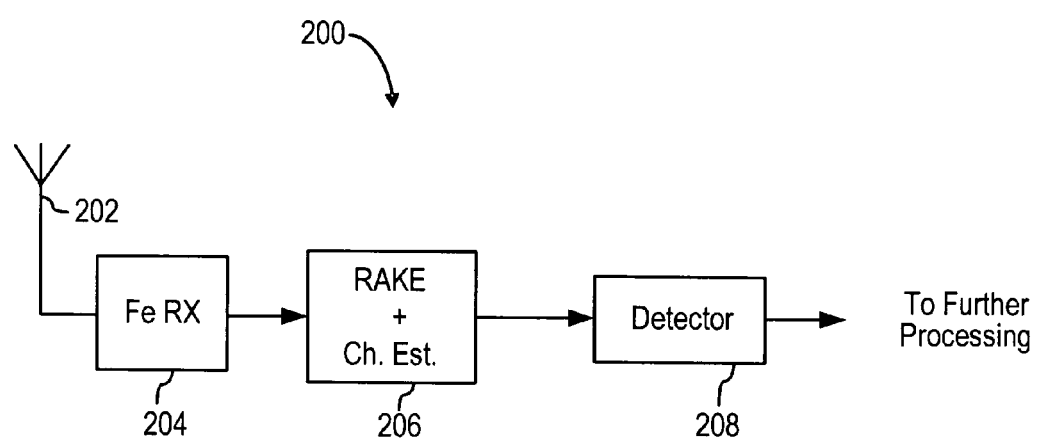
FIG. 2 is a block diagram of a receiver in a telecommunication system.

The various features of the invention will now be described with reference to the figures, in which like parts are identified with the same reference characters.

The various aspects of the invention will now be described in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

As mentioned earlier, it is desired to have a mechanism for selecting which cells to use when receiving MBMS application data. In one aspect of the invention, cell selection for MBMS is based on the quality of the channel carrying the MBMS application data. A number of techniques for determining this quality are described.

In another aspect, cell selection is based on what type of combining method can be applied if a signal from a candidate cell is selected.

These and other aspects will now be described in greater detail in the following description.

In WCDMA Release 99 ("Rel 99"), the strength of the individual cells is determined by comparing the received signal code power on the P-CPICH divided by the total received signal power ($E_c/N_o$). However, this cannot be used immediately as a quality measure for selecting which cells to use for MBMS reception because different cells might offset their MTCH power relative to the CPICH differently. There is thus a need for finding the power offset between the MTCH and CPICH in order to adjust the Rel 99 $E_c/N_o$) estimate to more accurately indicate the quality of the channel carrying the MBMS application data.

Several different techniques are possible for estimating the power offset: one involving calculation, and another involving signaling from a transmitting cell. These are now described in greater detail.

The discussion will first focus on calculation of the power offset. One technique involves estimating the power of both the CPICH and the MTCH, and then calculating the offset as the difference between the powers of the two channels. It can be assumed that the power offset between these two channels is constant, so that the offset can be later used when the received power level of the CPICH changes.

European Patent Application No. 03388046.9 (International Application No. PCT/EP2004/004946) describes estimating the received power level of the CPICH as part of a path-searcher for use in a RAKE receiver. In an aspect of the invention, the techniques described therein can be adapted to also estimate the power level of the MTCH. In particular, this document describes a method of detecting multipath components in a time-varying fading radio channel in a digital wireless communications system in which individual multipath components of a signal transmitted through the channel are received with individual delays within a range of possible delay values. The method comprises the steps of calculating repetitively a delay profile indicating a magnitude for each of a number of individual delay values, searching repetitively for new multipath components in a search window and positioning the search window based on at least one previously calculated delay profile. The positioning of the search window is at least intermittently based on a delay profile calculated for a range of delay values that is wider than the search window. In this way, a method is provided that is able to detect multipath components outside the path search window that is used for reporting paths to other parts of the receiver.

In the context of MBMS, since the MTCH is sent on the S-CCPCH without pilot symbols, the receiver has no prior knowledge of the sent symbols. The transmitted MTCH power can still be estimated, however, using a path-searcher on the data-symbols if no coherent accumulations are made between the symbols. That is, the path searcher applies the scrambling and channelization codes and sums the results over an entire symbol to obtain the power of the symbol. Doing this for a number of symbols and then averaging the symbol power values yields the average transmitted power on the physical channel. Any of a number of known path search techniques employing non-coherent accumulation may be used. The techniques described in International Publication Number WO 2004/112269 A1 are an example.

Another technique for estimating the power offset using only the amplitude information of the received signals is shown in European Patent Publication No. 1 480 350, which is hereby incorporated herein by reference. More particularly, the power offset is determined by estimating each of the channels, and then determining a scale factor (i.e., the power offset) that, when multiplied by one of the channel estimates, can be considered a best approximation of the other channel estimate. It will be understood that in such embodiments, the pilot channel estimate is a measure of a quality indicative of power on the pilot channel.

It should be noted that some MTCH symbols might be discontinuous transmission (DTX)—that is, not transmitted—which could deteriorate the quality of the estimate. To mitigate this effect, the measurement samples should be scheduled more often for a shorter amount of time, rather than more infrequently with each sample relying on more data.

There is yet another possibility for determining the received signal code power divided by the total received signal power ($E_c/N_o$) of the S-CCPCH from each cell, and that is for the cells to signal 1) the power offset that they are using between the S-CCPCH carrying the MTCH and the P-CPICH, and 2) the ratio between the receiver's "own" power offset ratio (i.e., power offset between the S-CCPCH carrying the MTCH and the P-CPICH) and one or more other cells' power offset ratios of MTCH power to P-CPICH. Regarding 2), if the signaled information is specified in decibels, then the difference between the power ratios would be used instead of ratios. Equivalent information can be signaled in other forms as well. In embodiments that utilize this signaling, there is no need to estimate the power offset in the UE as described above, since the receiver would be expressly informed of the power offset. For example, it has been proposed that 4 bits would be sufficient for communicating the information (1 dB step size; dynamic range 16 dB), which can be signaled in MCCH.

Once the power offset between the S-CCPCH carrying the MTCH and the P-CPICH has been estimated, a number of alternatives are possible for selecting which cells shall be selected by the receiver. For example, the cells can be ordered (e.g., in a list) according to their received signal strength, and the best ones selected. In another alternative, the cells can be ordered according to the SIR of the received S-CCPCH. In yet another alternative, the cells can be ordered based on a combination of the SIR and the combining method possible for the given radio link.

For example, a rule can be defined prioritizing the RAKE combining before the soft combining and least prioritized is the selective combining. The basis for such a prioritization is that RAKE combining is the least complex of the three methods and gives best performance, while the soft combining gives better performance than selective combining. One technique for implementing this prioritization is by selecting cells having the best (possibly adjusted) SIRs after first possibly adjusting the SIR of a cell either up or down to respectively increase or decrease its priority level based on the type of combining method possible for that cell. For example, the SIRs of the cells that can be RAKE combined with other radio links in the list are increased by a first predetermined amount, X1 dB, whereas the SIRs of the cells that cannot or should not be soft combined are decreased by a second predetermined amount, X2 dB. For example, a value for X1 can be selected in the range $0.5 \leq X1 \leq 1.5$, with X1=1 dB being a preferred value. A value for X2 can be selected in the range $0.5 \leq X2 \leq 3$, with X2=2 being a preferred value. It is advantageous to base these values on the gain that can be achieved in a particular embodiment by performing RAKE combining, and the amount of degradation associated with only being able to perform selective combining.

If a number, N, of cells having the highest adjusted SIR values can be RAKE combined, then RAKE combining will be performed on the signals coming from those cells. However, if the N cells having the best adjusted SIR values are cells that should be soft combined, then soft combining will be performed.

If the prioritized list of adjusted SIR values indicates that the N cells having the best adjusted SIR values cannot or should not be soft combined, then another prioritization is performed before selecting the N cells. In this re-prioritizing step, the X1 adjustment is made if cells can be RAKE combined, but no degradation is made if cells can only be selective combined (i.e., no X2 adjustment is made). Using this re-prioritized list, it is determined whether the N cells having the best re-adjusted SIR values should be RAKE combined or selective combined.

Figure 3A:
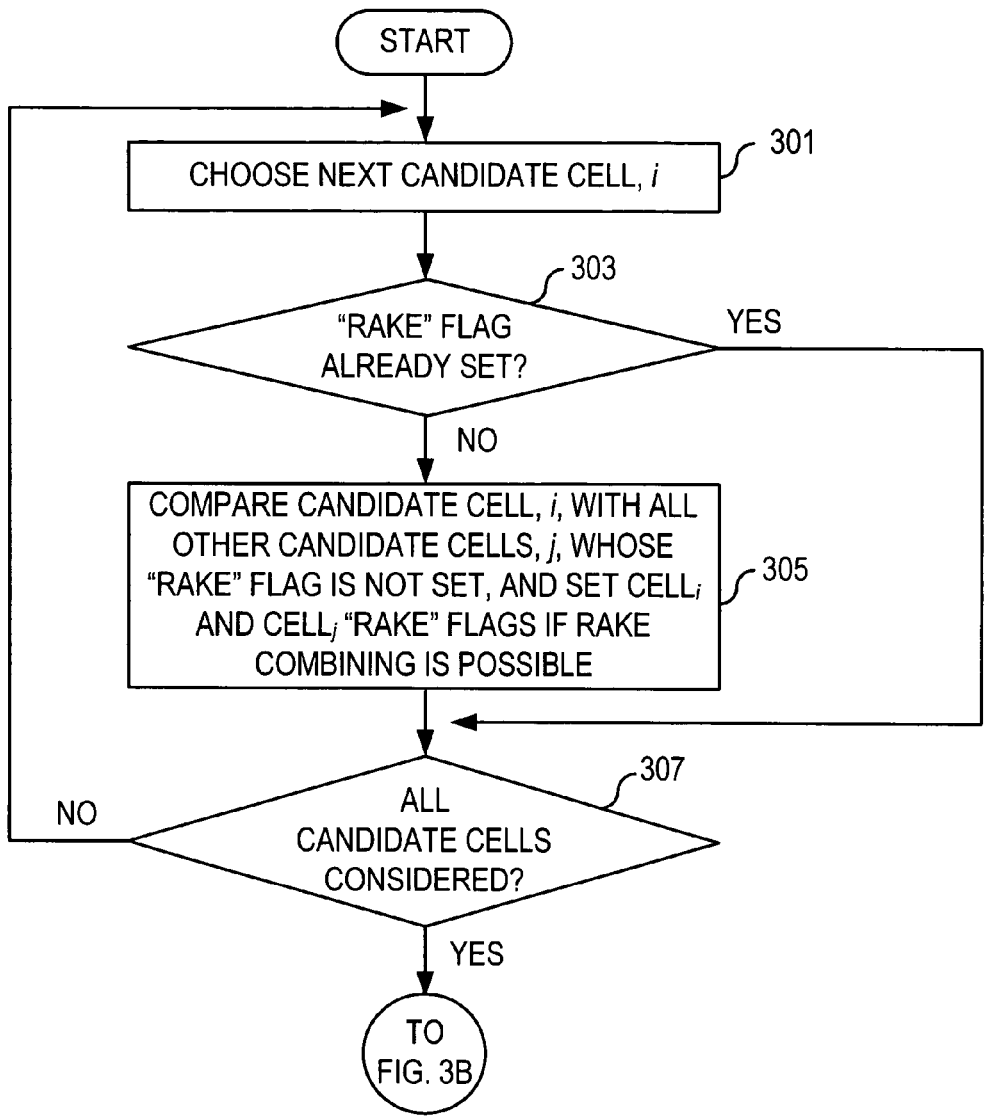
FIGS. 3A and 3B together are a flow diagram showing exemplary processes/steps carried out in a receiver for initially determining whether a particular cell can be RAKE, soft, or selective combined.
Figure 3B:
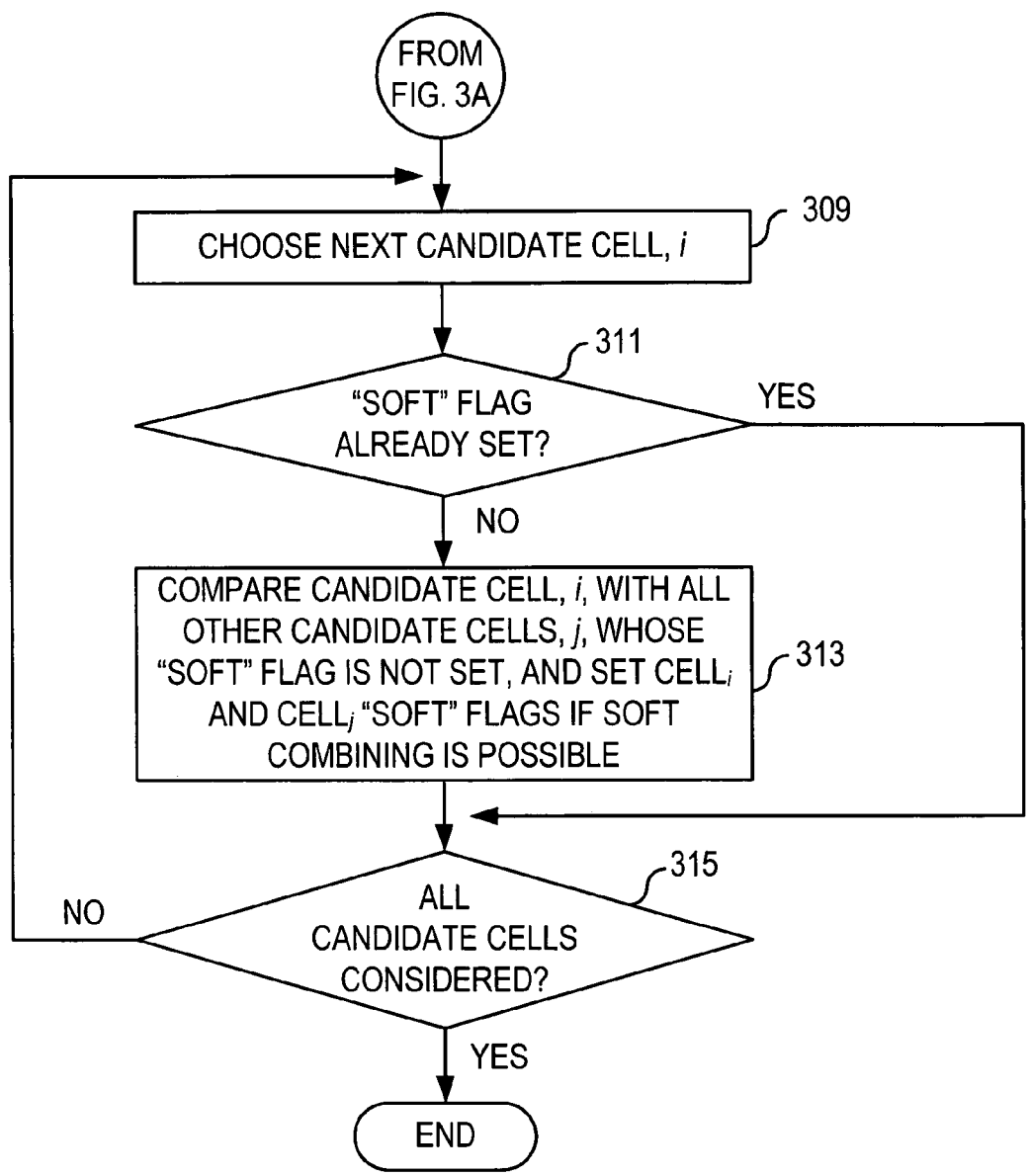

An exemplary embodiment will help illustrate these and other aspects. FIGS. 3A and 3B together are a flow diagram showing exemplary processes/steps carried out in a receiver for initially determining whether a particular cell can be RAKE, soft, or selective combined. In this embodiment, each cell is associated with two flags: a "RAKE" flag which, when set, indicates that the cell can be RAKE combined with another cell; and a "SOFT" flag which, when set, indicates that the cell can be soft combined with another cell. For each cell that can be RAKE combined, a list of the cells with which it can be RAKE combined is also maintained. Similarly, for each cell that can be soft combined, a list of cells with which it can be soft combined is also maintained. A cell having two flags, neither of which is set, is a candidate only for selective combining with other cells.

In the exemplary embodiment, initializing the proper settings of these flags for each cell begins with choosing a candidate $cell_i$ (step 301). In this process, candidate cells will be chosen in decreasing order of received SIR (or in alternative embodiments, $E_c/N_o$). If the candidate $cell_i$ already has its RAKE flag set ("YES" path out of decision block 303), then it is skipped by proceeding to decision block 307, which determines whether all possible candidate cells have been considered. If not ("NO" path out of decision block 307), then processing continues back at step 301.

If the candidate $cell_i$ does not already have its RAKE flag set ("NO" path out of decision block 303), then the timings of its first and last paths are compared with the timings of the last and first paths of each other $cell_j$ selected from the set of cells whose "RAKE" flag is not already set (step 305). If RAKE combining between the candidate cell$_i$ and the cell$_j$ is possible, then the RAKE flags of these two cells are set. RAKE combining is considered to be possible if the distance between the first path from one of the cells and the last path from the other cell is less than a number T1, which is preferably chosen to be between 1 and 3 slots.

Following this step, it is then determined whether all possible candidate cells have been considered (decision block 307). If not ("NO" path out of decision block 307), then processing continues back at step 301.

If all possible candidate cells have been considered ("YES" path out of decision block 307), then a similar process is repeated, this time to determine whether particular cells can be soft combined. Referring now to FIG. 3B, this begins by choosing a candidate cells (step 309). In this part of the process, candidate cells will again be chosen in decreasing order of received SIR (or in alternative embodiments, $E_c/N_o$). If the candidate cell$_i$ already has its SOFT flag set ("YES" path out of decision block 311), then it is skipped by proceeding to decision block 315, which determines whether all possible candidate cells have been considered. If not ("NO" path out of decision block 315), then processing continues back at step 309.

If the candidate cell$_i$ does not already have its SOFT flag set ("NO" path out of decision block 311), then the timings of its first and last paths are compared with the timings of the last and first paths of each other cell$_j$ selected from the set of cells whose "SOFT" flag is not already set (step 313). If SOFT combining between the candidate cell$_i$ and the cell$_j$ is possible, then the SOFT flags of these two cells are set. SOFT combining is considered to be possible if the distance between the first path from one of the cells and the last path from the other cell is less than the duration of one TTI plus one slot.

Following this step, it is then determined whether all possible candidate cells have been considered (decision block 315). If not ("NO" path out of decision block 315), then processing continues back at step 309.

If all possible candidate cells have been considered ("YES" path out of decision block 315), then the flag-setting process is complete.

At the conclusion of this process, the table contains the cells listed in decreasing order of received SIR (or in alternative embodiments, $E_c/N_o$), and each cell has an indicator of whether it can be RAKE and/or SOFT combined. It is possible for one or more cells to have both flags set since, if RAKE combining between two cells is possible, then soft combining is also possible.

Figure 4A:
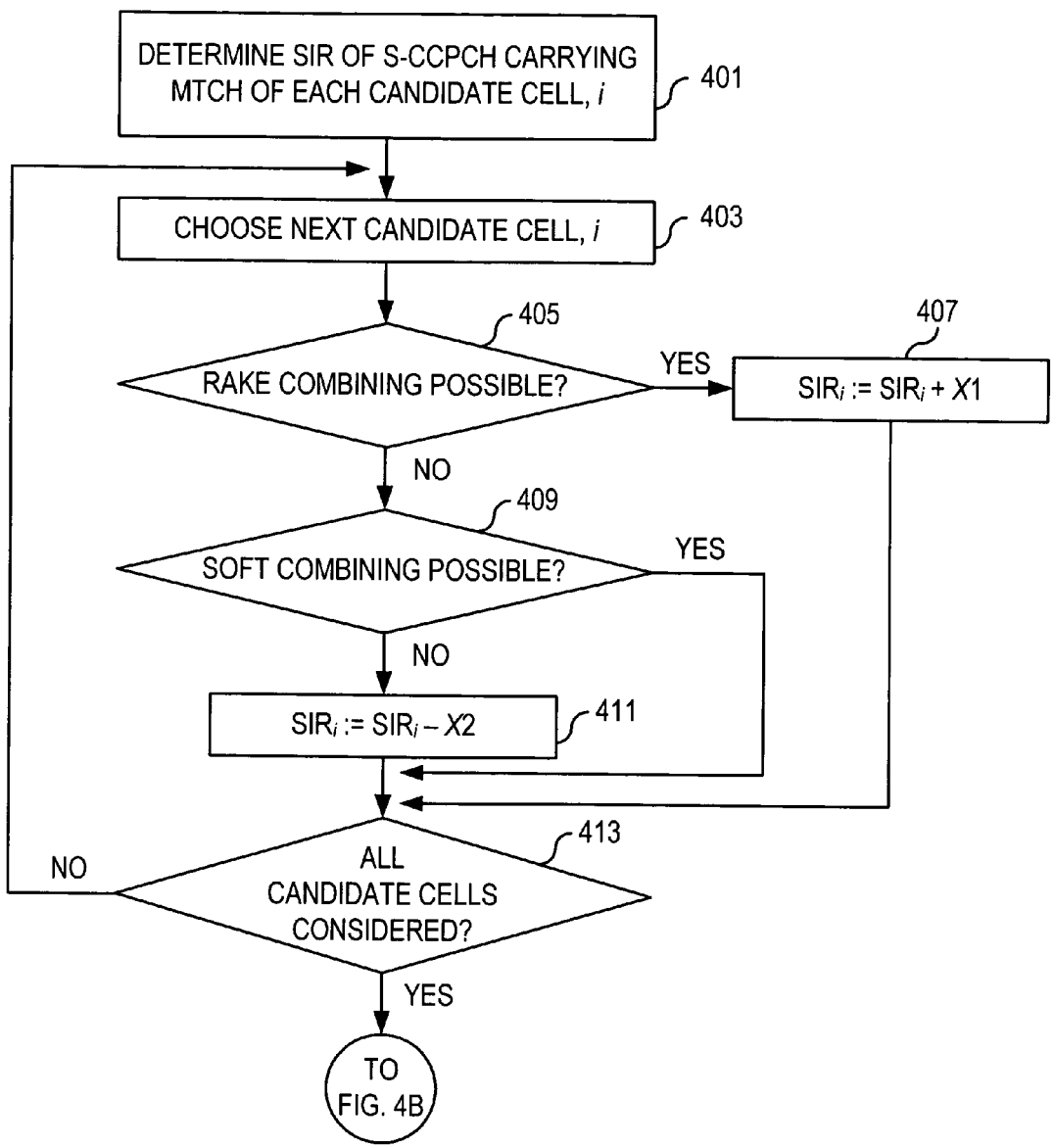
FIGS. 4A and 4B together are a flow diagram showing exemplary processes/steps carried out in a receiver for determining which cells will be combined, and what type of combining will be performed.
Figure 4B:
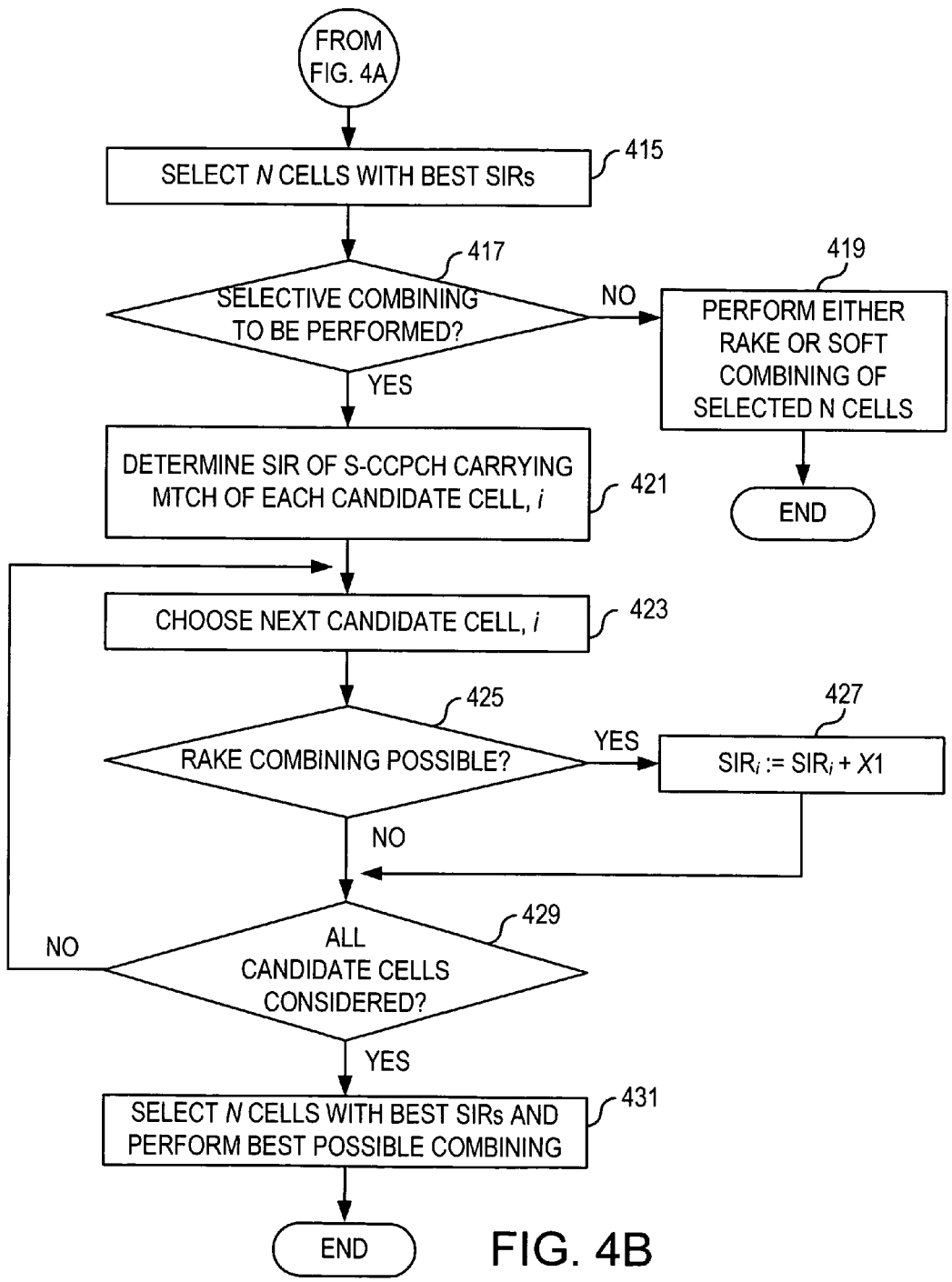

FIGS. 4A and 4B together are a flow diagram showing exemplary processes/steps carried out in a receiver for determining which cells will be combined, and what type of combining will be performed. It is desired to give preference to RAKE combining, which shows better performance than soft combining because more bits are used to represent the received data when doing the RAKE combining. A typical receiver will have two memories, one (called a RAKE memory) for taking care of combining paths from different cells and another (called a Soft Symbol memory) for storing a TTI for decoding purposes. Since for each symbol, the Soft Symbol memory needs to store information associated with a longer period of time than the RAKE memory (for SOFT combining, a TTI+1 slot compared to the RAKE memory's relatively short interval), it follows that for a given memory size more bits can be allocated to representing the information in the RAKE memory than in the Soft Symbol memory, making the bit representation more accurate in the RAKE memory than in the Soft Symbol memory, for example 16 bits in the RAKE memory versus 4 bits in the Soft Symbol memory.

Turning now to FIG. 4A, first, for each candidate cell, i, the SIR (or in alternative embodiments, $E_c/N_o$) of the S-CCPCH carrying the MTCH is determined in accordance with any of the above-described or other techniques (step 401). Then, for each of the candidate cells, i, the corresponding SIR$_i$ is adjusted as described above, based on the type of combining method that is possible. In this exemplary embodiment, this comprises identifying one of the candidate cells (step 403), and then determining (based on the RAKE flag) whether RAKE combining of the candidate cell's signals with signals from other cells is possible (decision block 405). If RAKE combining is possible ("YES" path out of decision block 405), then this cell is given a higher priority by increasing its initially-determined SIR value by a predetermined amount X1 (step 407). Following this step, processing continues to decision block 413, where it is determined whether the combinability of signals from all candidate cells has been considered. If not ("NO" path out of decision block 413), then processing returns to step 403 where another candidate cell is chosen for this aspect of the analysis.

Returning to decision block 405, if it is not possible to use the candidate cell's signals in a RAKE combining operation ("NO" path out of decision block 405), then processing continues to decision block 409, where it is determined (based on the SOFT flag) whether soft combining of the candidate cell's signals with signals from other cells is possible. If it is ("YES" path out of decision block 409), then in this exemplary embodiment no adjustment of priority is made; instead, processing proceeds to decision block 413, where it is determined whether the combinability of signals from all candidate cells has been considered. If not ("NO" path out of decision block 413), then processing returns to step 403 where another candidate cell is chosen for this aspect of the analysis.

If soft combining of the candidate cell's signals with signals from other cells is not possible ("NO" path out of decision block 409), then only selective combining of this candidate cell's signals will be possible. Accordingly, this cell's priority is effectively lowered by decreasing its initially-determined SIR value by a predetermined amount X2 (step 411). Following this step, processing continues to decision block 413, where it is determined whether the combinability of signals from all candidate cells has been considered. If not ("NO" path out of decision block 413), then processing returns to step 403 where another candidate cell is chosen for this aspect of the analysis.

After the combinability of signals from all candidate cells has been considered ("YES" path out of decision block 413), processing continues (refer to FIG. 4B) by selecting some number, N, of the cells having the highest (possibly adjusted) SIR values (or in alternative embodiments, $E_c/N_o$) (step 415). The particular cells selected will determine whether RAKE, SOFT, or selective combining will be performed. If selective combining will not be performed ("NO" path out of decision block 417), then reception of the signal will involve either RAKE or soft combining, as indicated by the RAKE and SOFT flags of the selected cells.

If selective combining is indicated ("YES" path out of decision block 417), then another set of adjusted SIR values (or in alternative embodiments, $E_c/N_o$ values) is generated so that a more accurate decision can be made concerning which cells should be RAKE combined. In particular, it is desired at this point to eliminate the possibility of selecting cells on the grounds that they could possibly be soft combined. In this exemplary embodiment, this involves determining the SIR of the S-CCPCH carrying the MTCH is determined in accordance with any of the above-described or other techniques (or alternatively, retrieved from a memory if it had been stored after step 401) (step 421). Then, for each of the candidate cells, i, the corresponding $SIR_i$ is adjusted based on whether or not it can be RAKE combined with one or more other cells. In this exemplary embodiment, this comprises identifying one of the candidate cells (step 423), and then determining (based on the RAKE flag) whether RAKE combining of the candidate cell's signals with signals from other cells is possible (decision block 425). If RAKE combining is possible ("YES" path out of decision block 425), then this cell is given a higher priority by increasing its initially-determined SIR value by a predetermined amount X1 (step 427). Following this step, processing continues to decision block 429, where it is determined whether the combinability of signals from all candidate cells has been considered. If not ("NO" path out of decision block 429), then processing returns to step 423 where another candidate cell is chosen for this aspect of the analysis.

Returning to decision block 425, if it is not possible to use the candidate cell's signals in a RAKE combining operation ("NO" path out of decision block 405), then processing continues to decision block 429, where it is determined whether the combinability of signals from all candidate cells has been considered. If not ("NO" path out of decision block 429), then processing returns to step 423 where another candidate cell is chosen for this aspect of the analysis.

After the combinability of signals from all candidate cells has been considered ("YES" path out of decision block 429), processing continues by selecting some number, N, of the cells having the highest (possibly adjusted) SIR values (or in alternative embodiments, $E_c/N_o$) (step 431). The particular cells selected will determine whether RAKE or selective combining will be performed (soft combining is not an option here).

Figure 4C:
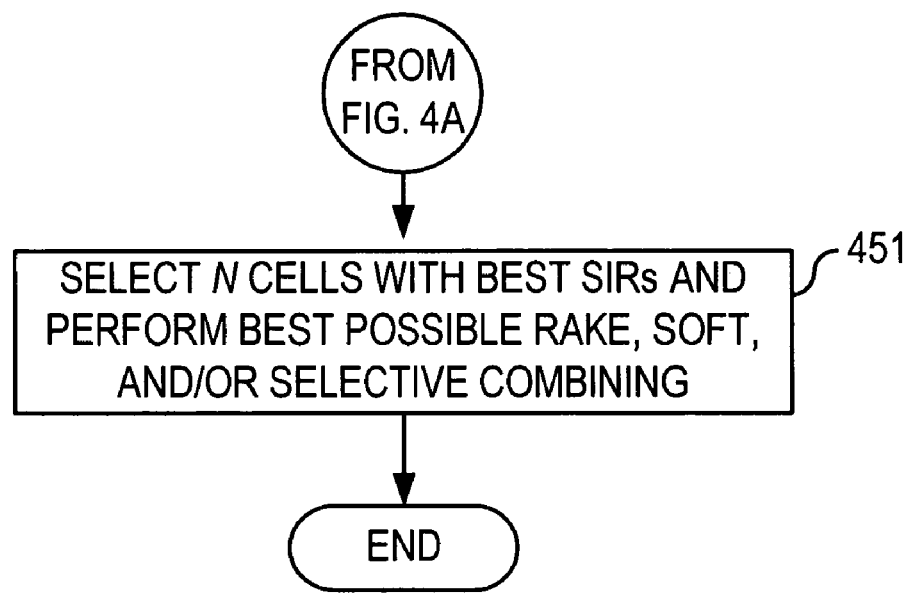
FIG. 4C is a flow diagram depicting an alternative embodiment of processes/steps carried out in a receiver for determining which cells will be combined, and what type of combining will be performed.

As an alternative to those aspects of the process depicted in FIG. 4B, one could adopt an alternative, simpler approach, such as the flowchart shown in FIG. 4C. Here, upon following the "YES" path out of decision block 413, the N cells having the best SIR values (or in alternative embodiments, $E_c/N_o$) are selected for the best possible RAKE, soft, and/or selective combining under the circumstances (451). This approach provides a great deal of flexibility, as the various types of combining can be used as appropriate to achieve improved results. For example, it might be decided that two signals should be RAKE combined, and that this RAKE combined signal should be soft combined with a third signal. The signal resulting from the soft combining process and a fourth signal (which itself could be the result of RAKE and/or soft combining) can then be inputs to a selective combining process.

Figure 5A:
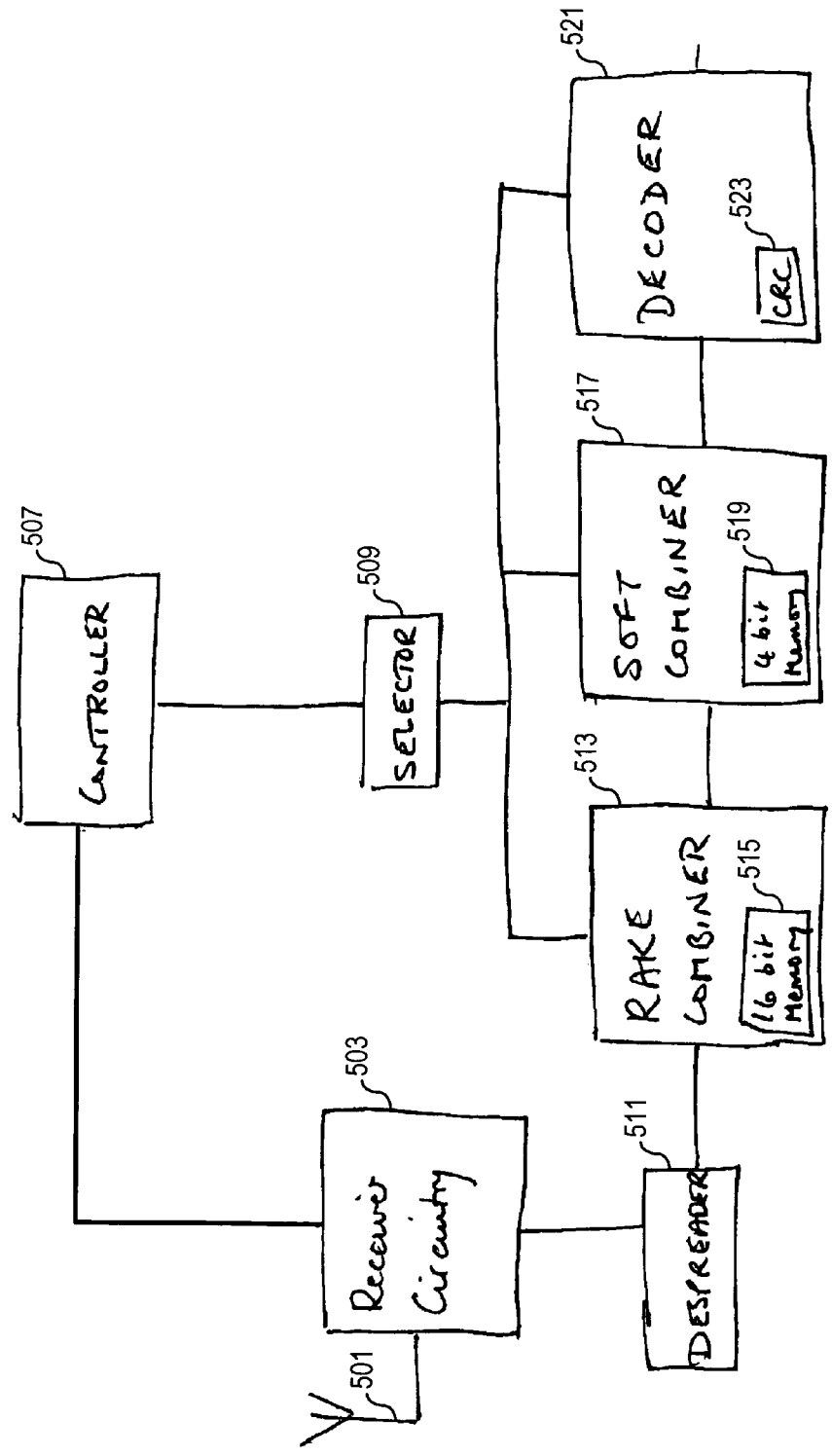
FIG. 5A is a block diagram of an exemplary receiver for carrying out the various aspects of the invention.

FIG. 5A is a block diagram of an exemplary receiver for carrying out the various aspects of the invention. The receiver includes an antenna 501 that picks up signals from the channel and supplies them to front end receiver circuitry 503. The front end receiver circuitry 503 down-converts and samples the received radio signal to a digital baseband signal, which is in turn supplied to a controller 507. The controller 507 uses these signals to control a selector 509. The selector 509, in carrying out the commands from the controller, determines which cells' signals will be selected during reception of the traffic channel, and what sort of combining (i.e., RAKE, soft, or selective) will be applied to these signals.

To enable different possibilities for cell selection and combining, the receiver further includes a despreader 511 which operates in a conventional manner. The despread signal is supplied to a RAKE combiner 513 that includes a memory 515 (e.g., a 16-bit memory capable of storing three slots worth of data). The output of the RAKE combiner 513 is supplied to a soft combiner 517 that includes a memory 519 (e.g., a 4-bit memory capable of storing two TTI's of data). The output of the soft combiner 517 is supplied to a decoder 521 that includes cyclic redundancy check logic 523.

Each of the RAKE combiner 513, soft combiner 517 and decoder 521 operate under the direction of the selector 509. It will be understood, then, that an important component to the operation of this arrangement is what takes place inside the controller 507.

Figure 5B:
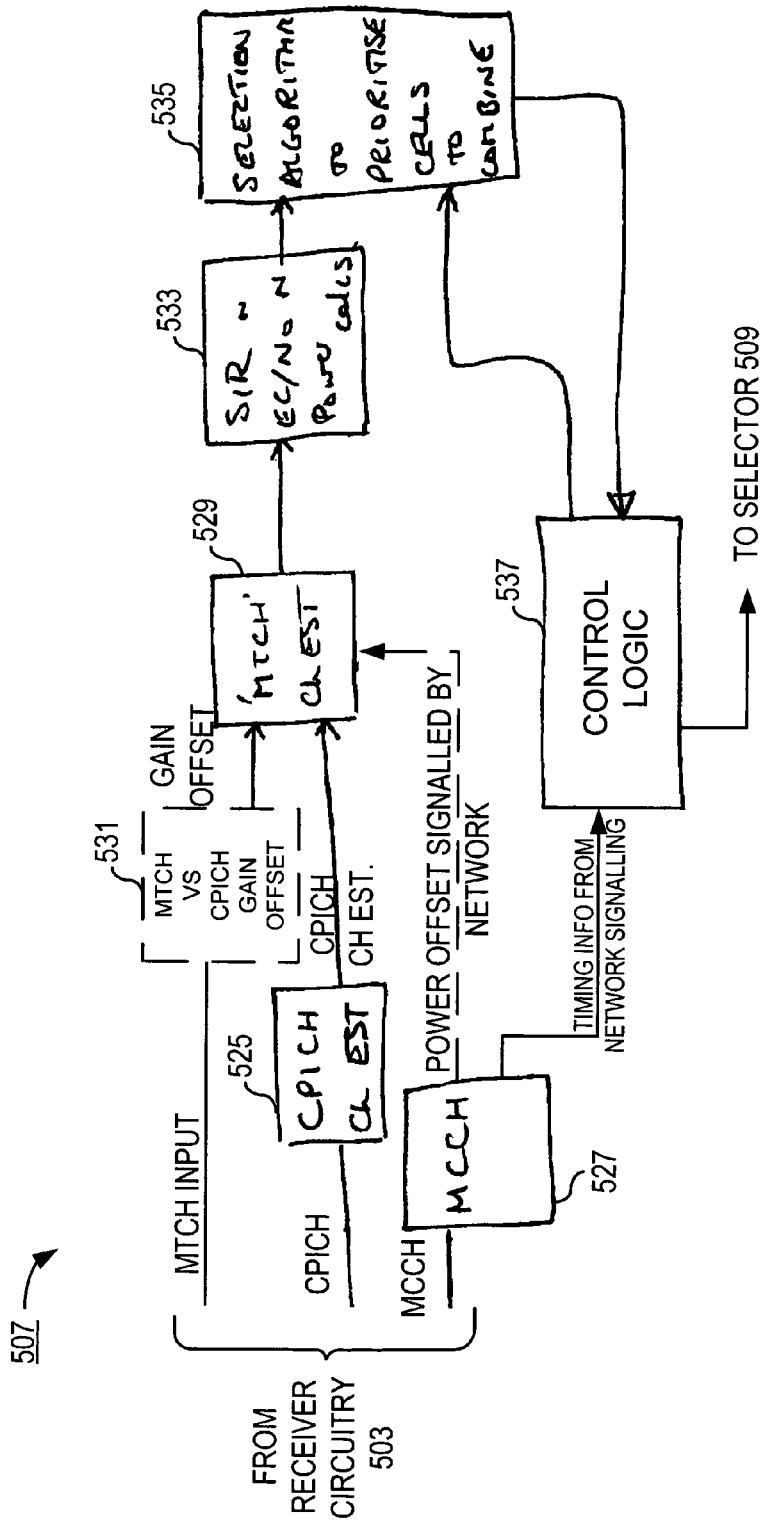
FIG. 5B is a block diagram of an exemplary embodiment of a controller for use in an exemplary embodiment.

FIG. 5B is a block diagram of an exemplary embodiment of the controller 507. In this example, logic for performing the various functions has been partitioned into the separate blocks as shown. It will be appreciated that, in other embodiments, a single processor running one or more program code segments may be employed. In the embodiment illustrated in FIG. 5B, the receiver signals are supplied to a CPICH channel estimator 525 which uses the pilot signals to generate an estimate of the pilot channel. Another block, MCCH logic 527, generates timing information for the MCCH, and supplies this to the control logic 537. In embodiments in which the power offset between the CPICH and the MTCH is signaled by the network, the MCCH logic 527 also extracts this information and supplies it to MTCH channel estimator 529. (This is depicted in dotted lines to denote the fact that this may not be present in alternative embodiments.) The MTCH channel estimator 529 uses the power offset value and the CPICH channel estimate (supplied by the CPICH channel estimator 525) to generate a channel estimate of the MTCH. The MTCH channel estimate is supplied to SIR or $E_c/N_o$ power calculation logic 533 which uses the fact that the channel estimate is indicative of the square root of the power to generate either a suitable SIR or $E_c/N_o$ value for the MTCH. The generated values are then supplied to prioritization/selection logic 535 which carries out methods such as those described earlier with reference to FIGS. 3A, 3B, 4A, and 4C.

The prioritization/selection logic 535 outputs its results to the control logic 537, which generates signals that control the selector 509 as described earlier.

Earlier it was mentioned that not all embodiments would be operating in an environment in which the power offset between the CPICH and the MTCH would be signaled by the network. Under these circumstances, it is useful to have an alternative embodiment that includes MTCH vs. CPICH gain offset determination logic 531. The MTCH vs. CPICH gain offset determination logic 531 generates an estimate of the gain offset between the MTCH and the CPICH using techniques such as those described in the above-referenced European Patent Publication No. 1 480 350.

It will be appreciated that the just-described embodiment is merely exemplary, and not limiting of the invention. For example, in some embodiments cells whose signals should not be RAKE combined but can be soft combined might have their SIRs increased by some amount greater than zero but less than X1. In some (but not necessarily all) of these alternative embodiments, cells whose signals can only be selective combined with the signals from other cells might not need to have their SIRs adjusted at all, since all other cells will have had their respective SIRs increased by some amount to indicate a higher priority amount.

The invention has been described with reference to particular embodiments. However, it will be readily apparent to those skilled in the art that it is possible to embody the invention in specific forms other than those of the embodiment described above.

For example, in the exemplary embodiment illustrated in FIG. 4B, if it is determined at decision block 417 that selective combining should be performed, soft combining is no longer considered but another analysis (involving adjustment of newly-obtained SIR values) is performed to determine whether RAKE or selective combining should be performed. However, in alternative embodiments, one could select the N cells with the best SIRS (as illustrated in step 415), and then immediately perform the best possible combining selected from RAKE, soft, or selective combining.

In other alternatives, received signal strength values can be used instead of SIR values as a basis for prioritizing cells for selection in embodiments similar to those described above.

Thus, the described embodiments are merely illustrative and should not be considered restrictive in any way.

What is claimed is:

1. A method of selecting one or more cells from which to receive information transmitted on a traffic channel that is not subject to power control in a cellular radio communications system, the method comprising:
    for each of a plurality of candidate cells, measuring a quality indicative of power of a signal transmitted on the pilot channel and using an offset value that indicates a relationship between the pilot channel transmission power and the traffic channel transmission power associated with the candidate cell to determine a value of quality indicative of power of a signal transmitted on the traffic channel associated with the candidate cell;
    allocating a selection priority to each of the candidate cells, wherein each allocated selection priority is based, at least in part, on which of a plurality of combining methods can effectively be used with a signal received on the traffic channel from a respective one of the candidate cells; and
    selecting, based on the values of quality indicative of power of a signal transmitted on the traffic channel and also on the allocated selection priorities of the candidate cells, a number, N, of cells from the plurality of candidate cells,
    wherein allocating the selection priority to each of the candidate cells comprises:
    allocating a higher priority to a cell whose received signal transmitted on the traffic channel may be RAKE combined with another cell's signal transmitted on the traffic channel;
    allocating an intermediate priority to a cell whose received signal transmitted on the traffic channel should not be RAKE combined with any other cell's signal transmitted on the traffic channel but whose received signal transmitted on the traffic channel may be soft combined with another cell's signal transmitted on the traffic channel; and
    allocating a lower priority to a cell whose received signal transmitted on the traffic channel should neither be RAKE nor soft combined with any other cell's signal transmitted on the traffic channel.

2. The method of claim 1, wherein the offset value is a gain offset value.

3. The method of claim 1, wherein the offset value is a power offset value.

4. The method of claim 1, wherein the quality indicative of power of the signal transmitted on the pilot channel is a channel estimate of the pilot channel.

5. The method of claim 1, wherein the quality indicative of power of the signal transmitted on the pilot channel is a power estimate derived from estimating a delay profile of the signal transmitted on the pilot channel.

6. The method of claim 1, wherein the quality indicative of power of the signal transmitted on the pilot channel is a signal-to-interference ratio of the signal transmitted on the pilot channel.

7. The method of claim 1, comprising:
    for each of the candidate cells, determining the offset value by estimating the pilot channel and estimating the traffic channel.

8. The method of claim 1, comprising:
    for at least one of the candidate cells, receiving the offset value in a signal transmitted by one of the cells.

9. The method of claim 1, wherein:
    allocating the higher priority to the cell whose received signal transmitted on the traffic channel may be RAKE combined with another cell's signal transmitted on the traffic channel comprises adjusting the value of quality indicative of power of the signal transmitted on the traffic channel of the cell.

10. The method of claim 1, wherein:
    allocating the lower priority to the cell whose received signal transmitted on the traffic channel should neither be RAKE nor soft combined with any other cell's signal transmitted on the traffic channel comprises adjusting the value of quality indicative of power of the signal transmitted on the traffic channel of the cell.

11. An apparatus for selecting one or more cells from which to receive information transmitted on a traffic channel that is not subject to power control in a cellular radio communications system, the apparatus comprising:
    circuitry configured to, for each of a plurality of candidate cells, measure a quality indicative of power of a signal transmitted on the pilot channel and use an offset value that indicates a relationship between the pilot channel transmission power and the traffic channel transmission power associated with the candidate cell to determine a value of quality indicative of power of a signal transmitted on the traffic channel associated with the candidate cell;
    circuitry configured to allocate a selection priority to each of the candidate cells, wherein each allocated selection priority is based, at least in part, on which of a plurality of combining methods can effectively be used with a signal received on the traffic channel from a respective one of the candidate cells; and
    circuitry configured to select, based on the values of quality indicative of power of a signal transmitted on the traffic channel and also on the allocated selection priority of the candidate cell, a number, N, of cells from the plurality of candidate cells,
    wherein the circuitry configured to allocate the selection priority to each of the candidate cells comprises:
    circuitry configured to allocate a higher priority to a cell whose received signal transmitted on the traffic channel may be RAKE combined with another cell's signal transmitted on the traffic channel;
    circuitry configured to allocate an intermediate priority to a cell whose received signal transmitted on the traffic channel should not be RAKE combined with any other cell's signal transmitted on the traffic channel but whose received signal transmitted on the traffic channel may be soft combined with another cell's signal transmitted on the traffic channel; and
    circuitry configured to allocate a lower priority to a cell whose received signal transmitted on the traffic channel should neither be RAKE nor soft combined with any other cell's signal transmitted on the traffic channel.

12. The apparatus of claim 11, wherein the offset value is a gain offset value.

13. The apparatus of claim 11, wherein the offset value is a power offset value.

14. The apparatus of claim 11, wherein the quality indicative of power of the signal transmitted on the pilot channel is a channel estimate of the pilot channel.

15. The apparatus of claim 11, wherein the quality indicative of power of the signal transmitted on the pilot channel is a power estimate derived from an output of circuitry configured to estimate a delay profile of the signal transmitted on the pilot channel.

16. The apparatus of claim 11, wherein the quality indicative of power of the signal transmitted on the pilot channel is a signal-to-interference ratio of the signal transmitted on the pilot channel.

17. The apparatus of claim 11, comprising:
circuitry configured to determine, for each of the candidate cells, the offset value by estimating the pilot channel and estimating the traffic channel.

18. The apparatus of claim 11, comprising:
circuitry configured to receive, for at least one of the candidate cells, the offset value in a signal transmitted by one of the cells.

19. The apparatus of claim 11, wherein:
the circuitry configured to allocate the higher priority to the cell whose received signal transmitted on the traffic channel may be RAKE combined with another cell's signal transmitted on the traffic channel comprises circuitry configured to adjust the value of quality indicative of power of the signal transmitted on the traffic channel of the cell.

20. The apparatus of claim 11, wherein:
the circuitry configured to allocate the lower priority to the cell whose received signal transmitted on the traffic channel should neither be RAKE nor soft combined with any other cell's signal transmitted on the traffic channel comprises circuitry configured to adjust the value of quality indicative of power of the signal transmitted on the traffic channel of the cell.

* * * * *